Patented Feb. 26, 1929.

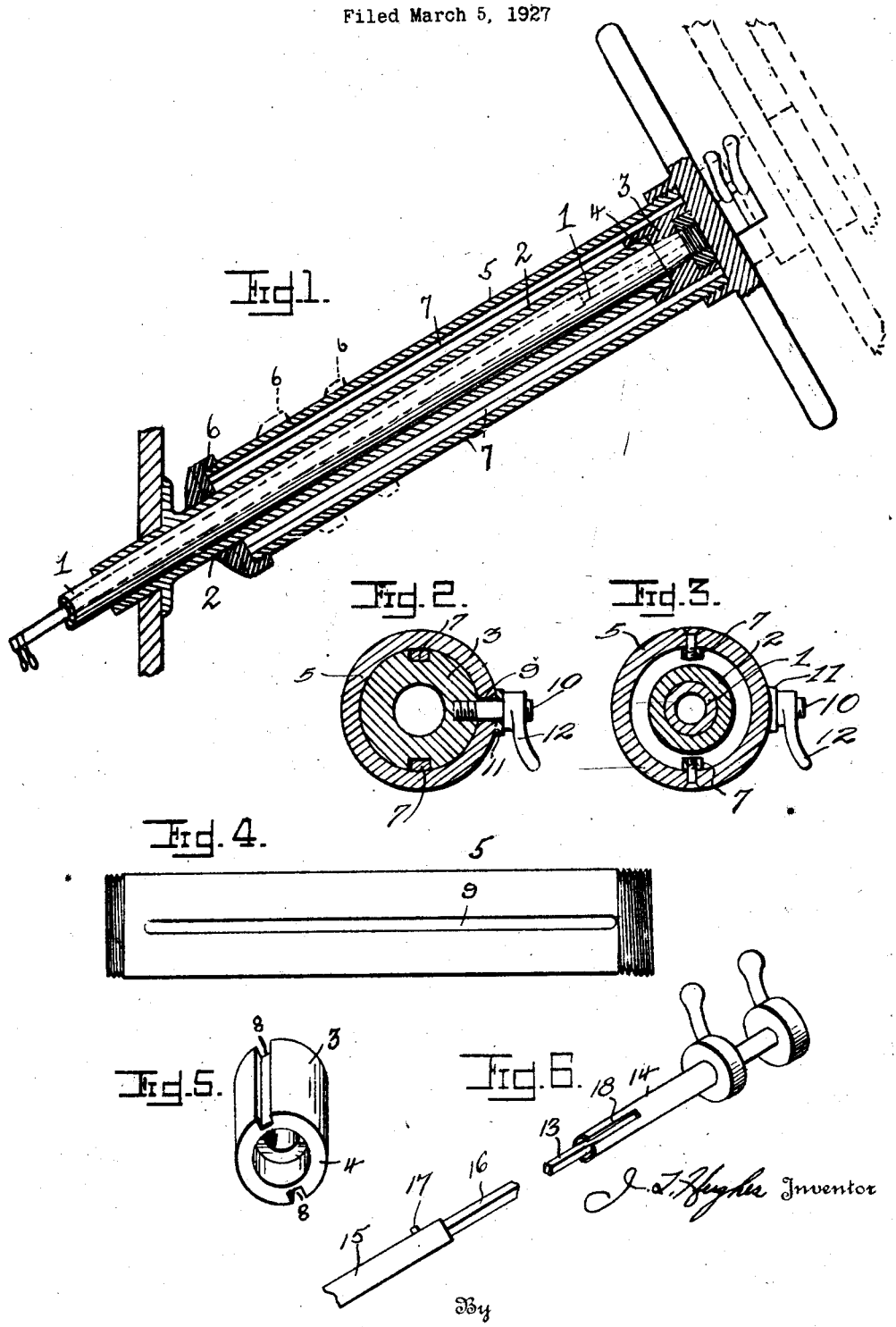

1,703,485

UNITED STATES PATENT OFFICE.

JOHN THOMAS HUGHES, OF COUNCIL BLUFFS, IOWA.

ADJUSTABLE STEERING POST FOR AUTOMOBILES.

Application filed March 5, 1927. Serial No. 173,108.

This invention relates to steering posts for motor vehicles and has for an object to provide a steering post which may be adjusted to any desired length.

Another object is to provide a means by which a steering wheel may be instantly adjusted to fit any driver.

Still another object is to provide a means by which the steering wheel may be pushed forward to allow more clearance, before the driver leaves the seat.

A further object is to provide a steering wheel which may be adjusted to fit any driver, without the necessity of an adjustable seat.

A still further object is to provide an adjustable steering post which is of simple construction, easy to adjust, and positive in action.

With these and other objects in view, I have invented an improved steering post for motor vehicles, illustrated in the accompanying drawings, in which:

Figure 1 is a longitudinal sectional view of the device.

Fig. 2 is a transverse section of column 5 and shaft cap 3.

Fig. 3 is a transverse section of column 5 stationary post 2 and shaft 1.

Figure 4 is a side view of the steering column.

Figure 5 is a perspective view of the cap for the steering rod.

Figure 6 is a perspective detail of the gas and spark rods.

Like reference characters indicate like parts throughout the following specification and in the several views in the drawings, in which 1 represents the steering rod of a motor vehicle, 2 the stationary post through which said rod extends, and 3 a cap which is secured to the rod 1. Said cap 3 is provided with a flange 4, which fits over the post 2, and serves as a guide bushing for the steering column 5, which is held in alinement at its lower end by a guide nut 6. Said steering column 5 is provided with a pair of ribs 7, which extend longitudinally thereof on the inside, and are slidable within a pair of grooves 8, in the cap 3. Said steering column 5 has an elongated slot 9 extending longitudinally thereof, through which a stud bolt 10 is inserted and threaded into the cap 3. A washer 11 fits over the stud bolt 10, which holds the steering column 5 in place by friction, when pressure is applied by the locking lever 12, which is threaded on the stud bolt 10. The spark and gas rods 13 and 14 extend upward through the steering shaft 1 and shaft cap 3. Rod 13 is squared on one end and telescopes into hollow rod 16 which is also squared on one end. The length of the squared ends is 10 inches which allows the gas and spark rods to be lengthened the same amount as the steering post. Rod 14 is round and hollow and telescopes over rod 15 which is also round. Rod 14 is slotted as at 18 to engage the dowel pin 17 on rod 15 so the rods will turn together. The slot 18 is also 10 inches in length so as to allow the rods to be lengthened the same amount as the steering post.

To assemble my invention, the guide nut 6 is slipped over the stationary post 2, the cap 3 secured in place, the steering column 5 slipped over the cap 3, the guide nut 6 is screwed to the steering column 5, the stud bolt 10 inserted through the slot 9 and threaded into the cap 3, the washer 11 slipped over the stud bolt 10, and the locking lever 12 threaded on the stud bolt 10. To adjust post turn handle 12 as shown on Fig. 3 a quarter turn; this releases the friction from washer 11; when the post is adjusted to a suitable length turn hadle 12 until it engages grip washer 11; this holds post securely in place.

Having described my invention, that which I claim to be new and desire to secure by Letters Patent, is:

1. A device of the character described, including a steering rod, a stationary post through which said rod extends, and an adjustable post connected with said steering rod.

2. A device of the character described, including a steering rod, a stationary post through which said rod extends, and an adjustable post connected with said steering rod, said adjustable post being slidable on said stationary post.

3. A device of the character described, including a steering rod, a stationary post through which said rod extends, a cap secured to said steering rod, and an adjustable post slidable over said cap and stationary post.

4. A device of the character described, including a steering rod, a stationary post through which said rod extends, a cap secured to said steering rod, an adjustable post slidable over said cap and stationary post, and a rib in said adjustable post, said rib being slidable within a groove in said cap.

5. A device of the character described, including a steering rod, a stationary post through which said rod extends, a cap secured to said steering rod, an adjustable post slidable over said stationary post, a rib in said adjustable post slidable within a groove in said cap, and a flange on said cap, which fits over said stationary post and within said adjustable post.

6. A device of the character described, including a steering rod, a stationary post through which said rod extends, a cap secured to said steering rod, an adjustable post which fits over said cap, a rib in said adjustable post slidable within a groove in said cap, and means for securing said adjustable post to said cap at any point desired.

7. A device of the character described, including a steering rod, a stationary post through which said rod extends, a cap secured to said steering rod, an adjustable post which fits over said cap, and means for securing said adjustable post to said cap at any point desired, said means including a stud bolt threaded into said cap, which extends through an elongated slot in said adjustable post.

8. A device of the character described, including a steering rod, a stationary post through which said rod extends, a steering wheel, a steering column secured to said wheel, a guide nut threaded on one end of said column through which said stationary post extends, a cap on said steering rod and stationary post, a stud bolt threaded into said cap, which extends through an elongated slot in said steering column, a washer fitting over said stud bolt, a locking lever threaded on said stud bolt in contact with said washer, a spark and gas rod extending through said cap, said spark and gas rods being hollow and square in cross section, and an extension which telescopes into each of said rods, connecting them with the steering wheel.

In testimony whereof I affix my signature.

JOHN THOMAS HUGHES.